March 19, 1957 W. F. SCHULTZ ET AL 2,785,568

TWO-SCALE DYNAMOMETER TESTING APPARATUS

Filed June 14, 1955 3 Sheets-Sheet 1

INVENTOR
WERNER F. SCHULTZ
MANLEY RUSSELL SEELHOF.
BY
ATTORNEY

March 19, 1957  W. F. SCHULTZ ET AL  2,785,568
TWO-SCALE DYNAMOMETER TESTING APPARATUS
Filed June 14, 1955  3 Sheets-Sheet 3

INVENTOR
WERNER F. SCHULTZ
MANLEY RUSSELL SEELHOF
BY
ATTORNEY

United States Patent Office 2,785,568
Patented Mar. 19, 1957

2,785,568

TWO-SCALE DYNAMOMETER TESTING APPARATUS

Werner F. Schultz and Manley Russell Seelhoff, Owosso, Mich., assignors to Redmond Company, Inc., Owosso, Mich., a corporation of Michigan Application June 14, 1955, Serial No. 515,304

20 Claims. (Cl. 73—134)

The present invention relates to a dynamometer testing apparatus designed to apply a selected one of a plurality of predetermined torque loads to the device being tested without having to make any manual load adjustments during the test. It is particularly well adapted for the testing of motors which operate at two speeds and which are to be tested under different torque loads for each speed, but it is applicable for use in other situations as well.

In the usual type of dynamometer the device to be tested, for example, an electric motor, is caused to drive an element, such as a conductive disk, in rotation. That element is operatively connected to a testing member in such a way as to tend to cause that member to be dragged around by the rotated element. While the operative connection can be frictional in nature, electromagnetic linking, usually of the eddy current type, is preferred because there are no engaging surfaces to wear down. Means are provided for establishing a nominal operating position for the member, and a force is applied to the member in that position which opposes movement of the member in its dragged direction, the interaction between member and element thus applying a predetermined restraining torque to the rotated element and therefore also to the device being tested. Departure of the member from its nominal position in its dragged direction causes a lessening of the drag, usually by actuating suitable circuit controls so as to decrease the energization of the electromagnetic coils carried by the member and which are active on the element. Movement of the member from its nominal position in the opposite direction causes an opposite effect, to wit, an increase in the drag. Consequently the restraining torque exerted on the device being tested is maintained within a predetermined range corresponding to said force applied to the member in opposition to its movement in the dragged direction.

In conventional dynamometers such a force is often provided by means of a weight or weights manually positionable on the member at locations appropriate to produce the desired restraining force or torque. When a new torque load was to be applied to the device being tested, therefore, it has been necessary to manually apply weights to or remove weights from the member or to shift the position of weights already thereon. These manual changes or adjustments are time consuming and are in practice subject to human error from one test to another.

The device and system of the present invention is specifically designed to permit the accurate and selective application of two or more different torque loads to the device being tested in an extremely effective and readily controlled manner. The dynamometer may be preset for the particular torque loads desired, and thereafter a simple and foolproof selecting operation, such as the throwing of an electrical switch, will condition the device to provide the precise torque load desired. In addition, in those cases where the different torque loads are to be applied when the device under test is differently energized or actuated, as in the case of a two-speed motor, the act of changing the energization of the motor from one condition to another can also control the dynamometer so that the torque load appropriate to that particular motor energization is automatically made effective. The device may also readily be modified so as to be useable in conjunction with motors rotating either clockwise or counter-clockwise.

These results are accomplished by providing, in addition to the means normally biasing the dragged member in a direction opposite to that in which it is dragged, an auxiliary biasing means which is normally in inoperative relation relative to the member. While the member operates within its normal range of positions it applies a first torque load to the device being tested. Means are provided, however, for shifting the range of operating positions of the member from its normal range to an auxiliary range displaced from the normal range in the dragged direction of the member, and means are provided for operatively connecting the member and the auxiliary biasing means whenever the member operates within this auxiliary range. Hence when it operates in the auxiliary range both biasing means will be active thereupon, and consequently it will exert on the device being tested a torque load greater than that which it formerly exerted, the increment of torque added being determined by the auxiliary biasing means. The shift of the operating positions of the member from the first range to the auxiliary range may readily be effected by shifting a pair of terminals between which a contact is movable, that contact in turn being movable in accordance with the position of the member. The position of these terminals relative to the member therefore will determine the range of operating positions of the member.

In the form here specifically disclosed the auxiliary biasing means is defined by a weighted rod or arm normally supported independently of and out of operative connection with the dragged member. The dragged member is provided with a part, such as a finger or other projection, which, when the member moves to a position within the auxiliary range of operating positions, engages the weighted arm and lifts it from its support, the weighted arm then moving with the dragged member and adding its force or torque to that normally associated with the dragged member itself.

The dragged member normally extends to both sides of an axis about which it is adapted to pivot, and the weighted arm may be positioned on either side of that axis, depending upon the direction in which the member is to be dragged, the arm always being positioned so as to be engaged by the member and lifted from its support when the member is moved in its dragged direction beyond its first range of operating positions to its auxiliary range of operating positions.

The structure of the device of the present invention is simple and inexpensive, and existing single scale dynamometers may readily be modified to incorporate the present invention without any appreciable reconstruction.

To the accomplishment of the above, and to such other objects as may hereinafter appear, the present invention relates to a dynamometer structure and control system as defined in the appended claims and as described in this specification, taken together with the accompanying drawings, in which:

Fig. 6 is a circuit diagram of a control arrangement for using the instant invention in conjunction with the testing of two-speed motors rotatable either clockwise or counter-clockwise.

Figure 1:
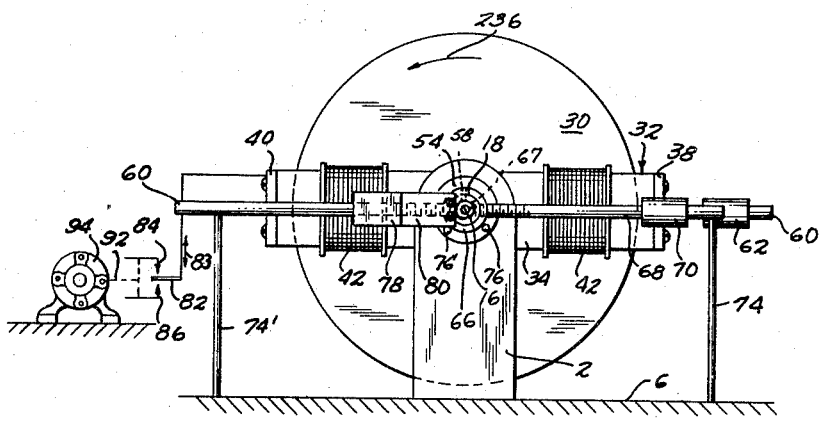
Fig. 1 is a front elevational view of one embodiment of the present invention, the device under test being omitted for purposes of clarity.

The dynamometer per se of the present invention, insofar as its conventional parts are concerned, is similar to that shown in Patent 2,677,962 of May 11, 1954, entitled "Dynamometer Control" and assigned to the assignee of the instant invention. It comprises a pair of standards 2 and 4 extending upwardly from a base 6 and having registering apertures 8 and 10 respectively within which bearings 12 and 14 respectively are received. A shaft 16 has one end journaled in the bearing 14, its other end extending out beyond standard 2 for an appreciable distance and terminating in coupling part 18 to which the output shaft 20 of a motor or other device 22 to be tested is adapted to be coupled by the part 24, a stand 26 being provided on which the motor 22 may be mounted for test. Secured to the shaft 16 for rotation therewith, by means of collars 28, is conductive disk 30, that disk being located on the shaft 16 substantially midway between the standards 2 and 4. The disk 30 constitutes the element driven in rotation by the motor 22 being tested.

Figure 3:
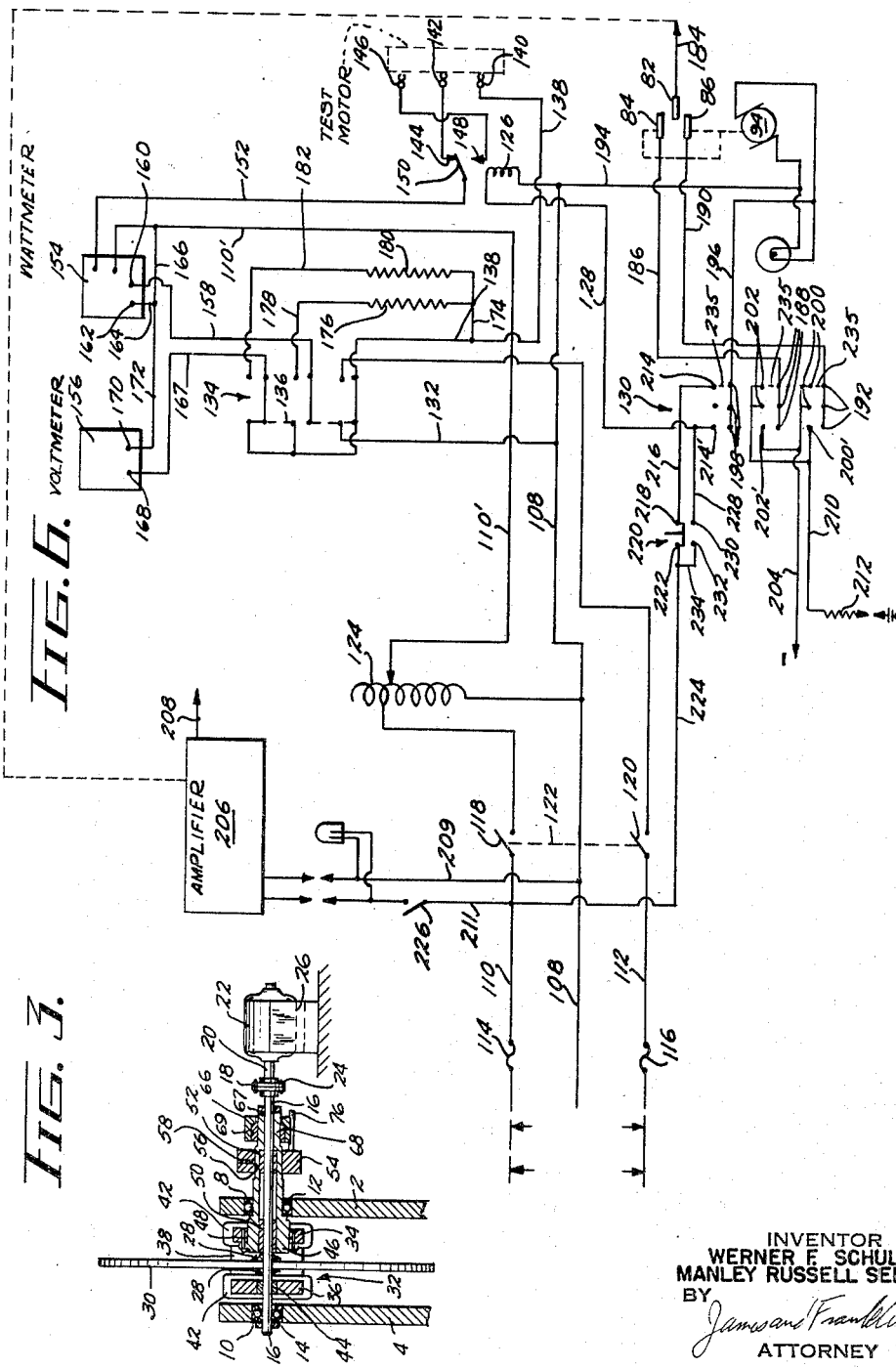
Fig. 3 is a cross sectional view taken along the line 3—3 of Fig. 2.

The member adapted to exert a drag on the disk 30, and to be dragged thereby, is defined by a yoke generally designated 32, that yoke being formed of arms 34 and 36 of magnetizable material connected by non-magnetic end pieces 38 and 40, electromagnetic coils 42 being mounted on the arms 34 and 36. The yoke 32 is mounted so as to be pivotable independently of the shaft 16. Referring particularly to Fig. 3, a bushing 44 carried by the yoke arm 36 is rotatably received over the left hand portion of the shaft 16. An elongated sleeve 46 is secured to the yoke arm 34 as by the screws 48, that sleeve extending from the arm 34 to the right, being journaled in the bearing 12 carried by the standard 2, and extending to the right beyond the standard 2. A bushing 50 is carried at the left hand end of the sleeve 46, and a bushing 52 is carried near the right hand end thereof, the shaft 16 being journaled within the bushings 50 and 52.

A collar 54 is mounted on a portion 56 of the sleeve 46 which extends to the right of the standard 2, that collar 54 being fast on the sleeve portion 56 by means of set screw 58. Diametrically opposed internally threaded apertures are provided extending inwardly from the periphery of the collar 54, and rods 60 are adapted to be received therein, a weight 62 being adjustably positionable along a selected one of the rods 60, depending on the direction of rotation of the disk 30, and held in position by means of set screw 64.

A collar 66 is freely rotatably mounted on the right hand end 67 of the sleeve 46, as by means of bushing 69. An internally threaded aperture is provided in the periphery of the collar 66, into which a rod 68 is adapted to be received, a weight 70 being adjustably positionable thereon and held in adjusted position by means of set screw 72. Standards 74 and 74' extend up from the base 6 in line with the rod 68, the rod 68 being supported in substantially horizontal position by one or the other of the standards 74 depending upon whether the rod 68 extends to one side or the other of the axis of the shaft 16, it being understood that the rod 68 can be manually swung to either supported position independently of the movement of any of the other parts of the device depending upon the direction of rotation of the disk 30.

Figure 2:
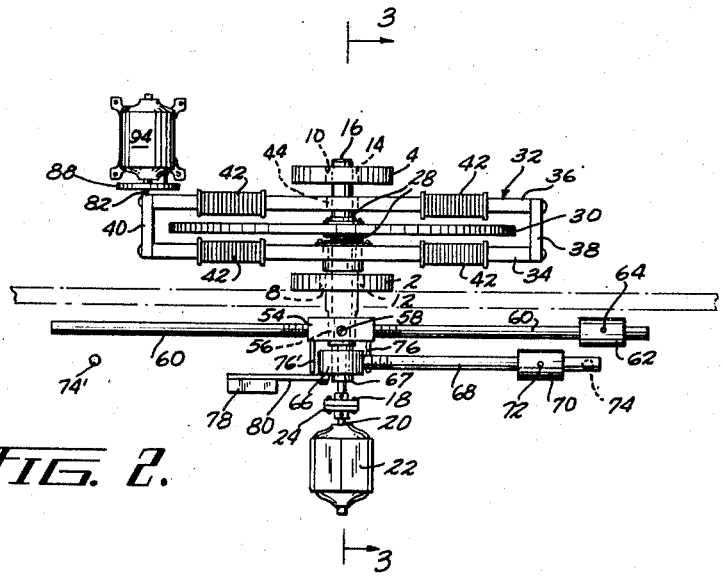
Fig. 2 is a top plan view thereof but with the device under test in position.

As may clearly be seen from Fig. 2, the collar 54 which carries the rod 60 is provided with a pair of fingers 76, 76' extending forwardly therefrom under the rod 68, and as may be seen particularly from Fig. 1, the fingers 76 and 76', when the yoke 32 is substantially horizontal, will be positioned beneath and spaced from the rod 68 when the latter is supported on the standard 74 or 74'. However, if, with the apparatus set up as shown in Fig. 1, the yoke 32 should pivot somewhat beyond its illustrated position in a counter-clockwise direction, the finger 76, which will move with the yoke 32, will engage the underside of the rod 68 and will lift that rod from the standard 74. The result will be that the rod 68 and the weight 70 carried thereby will exert a torque in a clockwise direction on the yoke 32 over and above that exerted by the weight 62 mounted on the rod 60. It may be desired, in order to counterbalance the effect of the rod 68 alone, to attach a weight 78 to the collar 66 by means of arm 80 and on the opposite side of the axis of rotation of the collar 66 from the rod 68. It will be noted that since the arm 80 is positioned forwardly of the tips of the fingers 76 and 76', it will never be engaged by those fingers.

In order to control the range of operating positions of the yoke 32, a contact 82 is operatively connected thereto in any appropriate manner so as to be movable up and down, as indicated by the arrow 83 in Fig. 1, as the yoke 32 pivots in a clockwise or counter-clockwise direction respectively. The contact 82 is interposed between terminals 84 and 86. In the form here specifically disclosed the terminal 84 is defined by a ring of conductive material secured in eccentric relation to a cam disk 88 by means of screws 90, and the terminal 86 is defined by a disk of conductive material mounted concentrically within the ring 84 by means of screw 90 and therefore also being eccentrically mounted with respect to the disk 88. The contact 82 is adapted to move vertically within the space 92 between the ring 84 and disk 86.

Figure 4:
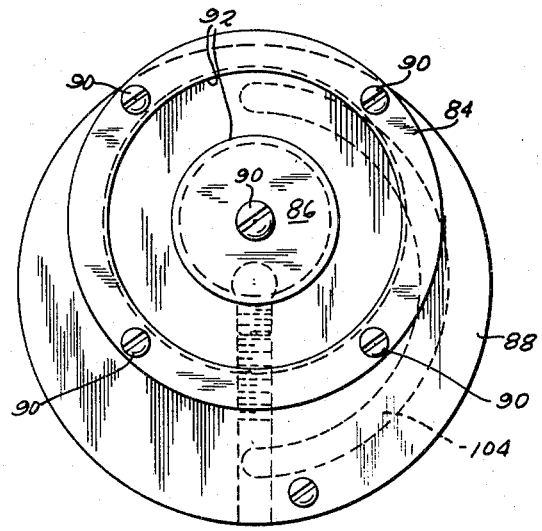
Fig. 4 is a front elevational view, on an enlarged scale, of the movable terminal assembly.
Figure 5:
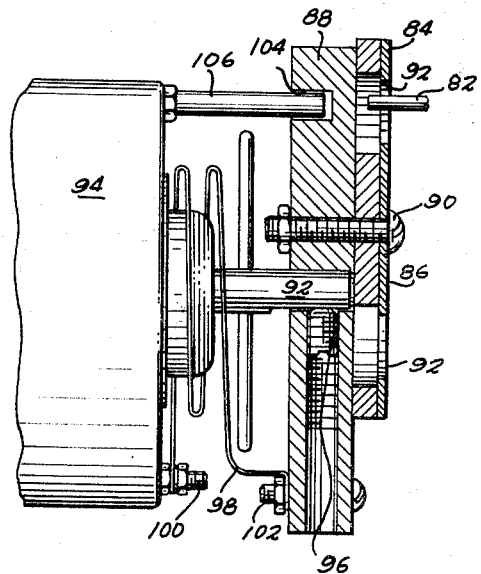
Fig. 5 is a fragmentary side elevational view, partially cross sectioned, showing the manner in which the terminal assembly is mounted on the actuating motor therefor.

The disk 88 is mounted on the output shaft 92 of a control motor 94, the shaft 92 being provided with a flat adapted to be engaged by a set screw 96 carried by the disk 88. A torsion spring 98 is operatively connected between a screw 100 on the motor 94 and a screw 102 on the disk 88, the spring being effective to rotate the disk 88 in a given direction (counter-clockwise as viewed in Fig. 4), energization of the motor 94 being effective to rotate the disk 88 in the opposite direction against the action of the spring 98. In Figs. 4 and 5 the disk is shown in its position corresponding to energization of the motor 54. The surface of the disk 88 facing the motor 94 is provided with a semi-circular groove 104 within which a pin 106 is received, that pin being secured to the motor 94 and thus limiting the movement of the disk 88 in one direction or the other.

Since the terminals 84 and 86 are eccentrically mounted with respect to the shaft 92 which defines the axis of rotation of the disk 88, movement of the disk 88 from one of its limits of movement to the other will cause a vertical shifting relative to the yoke 32 of the space 92 between the terminals 84 and 86 within which the contact 82 is received. With the disk 88 in its illustrated position the contact 82 is positioned appreciably above the axis of shaft 92. When the disk 88 is rotated 180°, the contact 82 will approach the axis of shaft 92. Since the contact 82 is fixed to the yoke 32 the position of the disk 88 will therefore determine the operating range of movement of the yoke 32. When the disk 88 is in the position shown in Fig. 5 the yoke 32 will assume its position shown in Fig. 1 during the operation of the device, and in this position, as has previously been explained, the weighted rod 68 will be disconnected from and will have no effect on the yoke 32. (As illustrated, this position of disk 88 corresponds to energization of the motor 94.) When the disk 88 is rotated 180 degrees from the position shown in Fig. 5, the space 92 within which the contact 82 is movable will shift downwardly relative to the yoke 32, that yoke will take up a range of operating positions such that it is pivoted in a counter-clockwise direction from that shown in Fig. 1, and that shift of the operating positions of the yoke 32 will be sufficient for the finger 76 on the collar 54 to lift the rod 68 from the standard 74, thus providing an additional increment of torque effective to resist movement of the yoke 32 in a counterclockwise direction. (As illustrated, this position of disk 88 is one which the spring 98 will cause it to assume when the motor 94 is not energized.)

Appropriate electrical connections are made to the terminals 84 and 86, and between those terminals, the contact 82, the coils 42 and appropriate electrical circuitry so that engagement of the contact 82 with one of the terminals 84 or 86 will cause increased energization of the coils 42, and consequently increased electromagnetic drag between the disk 30 and the yoke 32, engagement of the contact 82 with the other terminal 86 or 84 causing decreased energization of the coils 42 and consequently decreased drag between the disk 30 and the yoke 32, the particular effect of the terminal 84 or 86 being selected in accordance with the direction of rotation of the disk 30.

The mode of operation of the device of the present invention can perhaps best be understood by a consideration of the circuit diagram of Fig. 6. Three A. C. power input lines 108, 110 and 112 are provided, line 110 having a potential of 115 volts above line 108 and line 112 having a potential of 115 volts below line 108, a potential difference of 230 volts therefore existing between lines 110 and 112. Fuses 114 and 116 may be provided in the lines 110 and 112 respectively, as well as on-off control switches 118 and 120 operatively linked together as indicated by the dotted line 122. A variable auto-transformer 124 or other appropriate adjustable potential varying device may be interposed between lines 108 and 110, so that the potential between lines 108 and 110' and between lines 110' and 112 may be precisely adjusted. The line 108, which may be at ground potential, is connected to relay coil 126, the other end of that coil 126 being connected by line 128 to terminal 214' of three-position switch 130. The line 108 is also connected by line 132 to an appropriate terminal of two-position switch 134. When the switch 134 is in the position shown the left hand terminals thereof are all connected together as indicated by the broken line 136. Hence a circuit may be traced from line 108 and line 132 through line 138 to motor terminal 140. Motor terminal 142 is connected to terminal 144 and motor terminal 146 is connected to terminal 148, the armature 150 engaging with one or the other of the terminals 144 or 148 depending upon whether the relay coil 126 is energized or not. When the relay coil 126 is not energized contact is made between the armature 50 and the terminal 144, as illustrated, and a circuit can then be traced from the motor terminal 142 through line 152 and wattmeter 154 to line 110'. When the relay coil 126 is energized a circuit may be traced from the motor terminal 146 through the line 152, and the wattmeter 154 to the line 110'. However, so long as the switch 134 is in its position shown, the common motor terminal 140 will still be connected to the line 108. The motor terminals 142 and 146 could correspond to the low and high speed terminals of a two speed motor.

When the condition of the switch 134 is altered so that the right hand terminals thereof are all connected together the common motor terminal 140 will be connected to the power line 112 via line 138 and the lower right hand pair of terminals of the switch 134. Connection of motor terminal, 142 or 146 to power line 110' will, as before, be determined by whether relay coil 126 is deenergized or energized.

Hence it will be seen that switch 134 will control the magnitude of the voltage applied to the motor under test, and relay 126, 150 will control across which of the motor terminals that voltage is applied.

The central and upper pairs of contacts of the switch 134 are provided to modify operation of the wattmeter 154 and voltmeter 156 for operation at different voltage levels. With the switch 134 in its position shown in Fig. 6, a circuit may be traced from lines 108 and 132 through line 158 to terminal 160 of the wattmeter 154 and then from terminal 162 thereof to line 110' via lines 164 and 166. Similarly a circuit may be traced from lines 108 and 132 through line 167 to terminal 168 of voltmeter 156 and then from terminal 170 thereof through lines 172 and 166 to line 110'. When the switch 134 is in its other position a circuit may be traced from line 112 through lines 138 and 174 to the lower end of resistor 176, the upper end of resistor 176 being connected by line 178 and the central right hand pair of contacts of switch 134 to line 158. Line 174 also connects to the lower end of resistor 180 the upper end of which is connected, by means of line 182 and the upper right hand pair of contacts of the switch 134, to line 167. Hence shifting of the switch 134 puts resistors 176 and 180 in series respectively with the wattmeter 154 and the voltmeter 156.

The contact 82 secured to the yoke 32 is connected by means of line 184 to the grid of a control tube in amplifier 206, the output of that amplifier being connected by line 208 to the dynamometer coils 42 carried by the yoke 32. Power and voltage for the amplifier are provided by line 209 and 211 connected respectively to power lines 108 and 110, and switch 226 is in line 211 to turn the amplifier 206 on and off.

The terminal 84 is connected by means of line 186 to the terminals 188 of switch 130. The terminal 86 is connected by means of line 190 to the terminals 192 of the switch 130. One end of the motor 94 which controls the position of the terminals 84 and 86 is connected by means of line 194 to the common power line 108. The other end of the motor 94 is connected by means of line 196 to the terminals 198 of the switch 130. The two right hand terminals 200 of the switch 130, and the left hand terminal 202' thereof, are connected by line 204 to a charging circuit negative in potential with respect to ground. The right hand terminals 202 of the switch 130, and the left hand terminal 200' thereof, are connected by means of line 210 to ground through five megohm resistor 212. The right hand terminal 214 of the switch 130 is connected by line 216 to terminal 218 of switch 220, the opposing terminal 222 thereof being connected by line 224 to the power line 110. The left hand terminal 214' of the switch 130 is connected to line 128 and also, via line 228, to terminal 230 of switch 220, the opposite terminal 232 thereof being connected by line 234 to line 224.

The switch 130 conditions the dynamometer circuits and the relay 126, 150 for operation with test motors which rotate either in one direction or the other. The switch 220 controls the torque applied to the motor and also controls the energization of the relay 126, 150, thereby determining, in the case of a two-speed motor for example, whether the motor is energized for one speed or the other.

The switch 130 is set as shown in Fig. 6, with the right hand upper, lower and intermediate pairs of terminals respectively interconnected, as indicated by the lines 235, when the motor 22 being tested will produce counterclockwise rotation of the disk 130, as indicated by the arrow 236 of Fig. 1. With the switch 220 in its position shown, connecting the terminals 218 and 222 but disconnecting the terminals 230 and 232, the circuit through the relay coil 126 will be open, the relay armature 150 will assume its position shown, and voltage will be applied between the common motor terminal 140 and the low speed motor terminal 142. The motor 22 under test will therefore operate at low speed. The motor 94 will be energized, since one end is connected to power line 108 by line 194 and its other end is connected to power line 110 by line 196, right hand switch terminals 198 and 214, line 216, terminals 218 and 222 of switch 220, and line 224. Hence the disk 88 will assume its position shown in Fig. 5.

As the yoke 32 is dragged in a counter-clockwise direction as viewed in Fig. 1 against the action of the weight 62 will engage the terminal 86 and the grid of the control tube of the amplifier 206 will be driven in a negative direction, thus reducing the energization of the coils 42 and permitting the yoke 32 to slip back in a clockwise direction under the influence of the weight 62. When the contact 82 engages the terminal 84 the negative charge on the grid of the control tube in the amplifier 206 will slowly leak off to ground through resistor 212, the grid will become less negative, the output from the amplifier 206 will increase, the energization of the coils 42 will increase, and the yoke 32 will be dragged in a counter-clockwise direction. Thus the position of the yoke 32 will vary within a first range of operating positions determined by the fact that the terminals 84 and 86 are comparatively remote from and above the axis of the shaft 92 of the motor 94, and a torque determined primarily by the weight 62 will be exerted on the motor 22 being tested.

Upon shifting of the switch 220, so that the terminals 230 and 232 are bridged while the terminals 218 and 222 are disconnected, the following will occur: (1) The motor 94 will be deenergized, the spring 98 will rotate the disk 88, and consequently the position of the terminals 84 and 86 relative to the yoke 32 and contact 82 will be lowered (although the terminals 84 and 86, when engaged by the contact 82, will still exert the same effect on the energization of the coils 42 as has previously been described), and consequently the yoke 32 will assume an auxiliary range of operating positions in which it is pivoted in a counter-clockwise direction as viewed in Fig. 1 sufficiently far so that its fingers 76 will engage and lift the rod 68 from the standard 74. Consequently the torque exerted on the motor 22 will be increased. (2) At the same time the relay coil 126 will be energized, since its line 128 will be connected to power line 110 via line 228, the switch 220, and lines 234 and 224. The armature 150 will engage with the terminal 148, energizing voltage will be applied across the motor terminals 140 and 146, and the motor 22 under test will be caused to operate at high speed.

If the switch 134 is shifted so that all of its left hand pairs of terminals are respectively connected together, then the position of the switch 220 will have the same effect on the relay 126, 150 as has just been described, but it will have an opposite effect on the energization of the motor 94. With the switch 220 in its illustrated position and with the upper left hand pair of terminals of the switch 130 connected, the relay 126, 150 will be deenergized and the motor 94 will also be de-energized. Shifting of the switch 220 so that the terminals 230 and 232 are bridged instead of the terminals 218 and 222 will result in simultaneous energization of the relay 126, 150 and the motor 94. By connecting the intermediate and lower left hand terminal pairs respectively in the switch 130 the effect of the terminals 84 and 86, when engaged by the contact 82, will be reversed from that previously described, engagement of contact 82 with terminal 84 driving the grid of the control tube in the amplifier 206 more negative and engagement of contact 82 with terminal 86 permitting the negative charge on the grid of the control tube to leak off to ground. Thus it will be apparent that setting of the switch 130 to interconnect the left hand pairs of terminals will condition the dynamometer apparatus for operation when the motor 22 being tested will rotate the disk 30 in a clockwise direction as viewed in Fig. 1. With the switch 220 in its illustrated position the motor will be operated at its low speed and a low level of torque, determined by the weight 62, will be applied to the motor 22. Shifting of the switch 220 will cause the motor 22 to operate at its high speed and will cause the terminals 84 and 86 to shift their position so that the yoke 32 can pivot in a clockwise direction as viewed in Fig. 1 to its auxiliary range of operating positions, thus picking up the rod 68 from the standard 74' and causing a torque of greater magnitude, determined by the weights 62 and 70 together, to be applied to the motor 22 under test.

The switch 130 is here shown as a three-position switch. In its intermediate position connections to the terminals 84 and 86 correspond to those obtaining when the switch 130 is in its right hand position. The central position of the switch 130 therefore corresponds to rotation of the motor 22 under test in such a direction as to rotate the disk 30 counter-clockwise as viewed in Fig. 1 in the direction of the arrow 236. However, when the switch 130 is in its intermediate position shifting of the switch 220 will have no effect on the motor 94. It will, however, have its previously described effect on the energization of the relay 126, 150. The central position of the switch 130 may therefore be used in connection with the testing of two speed motors where the same torque is to be applied thereto independently of its speed of rotation, in which case the switch 220 will merely control the torque. The central position of the switch 130 may also be used when single speed motors 22 are to be tested and where but a single torque is to be applied thereto, in which case the motor terminals 142 and 146 will be connected together and the switch 220 will have no effect on the motor 22. It will be apparent that the switch 130 could also be provided with an additional position corresponding to its central position as illustrated but conditioning the dynamometer for use with a motor 22 which will rotate the disk 30 in a clockwise direction as viewed in Fig. 1.

From the above it will be apparent that when the switch 30 is either in its right or left hand position actuation of the switch 220 will simultaneously change the speed of operation of the motor 22 under test and condition the dynamometer so that a different torque appropriate to the changed speed will be applied to that motor. The magnitude of the torque will be determined in known fashion by the masses of the weights 62 and 70 and by their positions along the rods 60 and 68 respectively.

While the present invention has been here specifically described in connection with the testing of two-speed electric motors in which the variation in speed is controlled by the selective connection of the motor terminals 142 or 146 to a power source, the testing of other types of two-speed motors or the testing of motors subjected to other types of selective energization could also be readily accomplished, the modification of the system here disclosed being effected by appropriate changes in the circuitry controlled by the relay 126, 150. While the dynamometer in connection with which the instant invention has been here disclosed produces a drag by electromagnetic interaction, the magnitude of that drag being controlled by varying the energization of coils 42 carried by the yoke 32, it will be understood that the present invention is applicable to dynamometers utilizing drag produced in different manners, the magnitude of that drag being controlled electrically or otherwise in accordance with the engagement of the member 82 with the members 84 or 86 in any appropriate manner. While the biasing or torque-applying means here disclosed are in the form of weights mounted on pivotable elements at points remote from their pivotal axes, it will be further understood that biasing or torque producing elements specifically different therefrom could also be employed. An obvious extension of the specific teachings of this disclosure could produce a device which would provide three, or even more, individual torque settings. Many other variations in the structure or design of the instant invention could also be carried out without departing from the spirit of the invention as defined in the following claims.

We claim:

1. In a dynamometer comprising a primary member movable in accordance with drag exerted thereon by a rotated element and operatively connected to a contact-making member adapted to move between two terminals in accordance with the position of said primary member, making of contact with one terminal increasing the drag and making of contact with the other terminal decreasing the drag, the normal operating positions of said primary member therefore being within a given range; the improvement which comprises means sensitive to the movement of said primary member beyond said given range in a given direction for adding an increment of force thereto opposing said drag, and control means operatively connected to said terminals for moving them in a direction to cause said primary member to operate within an auxiliary range beyond said given range in said given direction.

2. In a dynamometer comprising a primary member movable in accordance with drag exerted thereon by a rotated element and operatively connected to a contact-making member adapted to move between two terminals in accordance with the position of said primary member, making of contact with one terminal increasing the drag and making of contact with the other terminal decreasing the drag, the normal operating positions of said primary member therefore being within a given range; the improvement which comprises an auxiliary member engageable by said primary member when the latter moves beyond said given range in a given direction, thereby adding an increment of force to said primary member in opposition to said drag, and control means operatively connected to said terminals for moving them in a direction to cause said primary member to operate within an auxiliary range beyond said given range in said given direction.

3. In a dynamometer comprising a primary member movable in accordance with drag exerted thereon by a rotated element and operatively connected to a contact-making member adapted to move between two terminals in accordance with the position of said primary member, making of contact with one terminal increasing the drag and making of contact with the other terminal decreasing the drag, the normal operating positions of said primary member therefore being within a given range; the improvement which comprises an auxiliary member, means for supporting said auxiliary member independently of said primary member and operatively disconnected from said primary member when said primary member is positioned within said given range, means operatively connecting said primary and auxiliary members and disconnecting said auxiliary member from said supporting means when said primary member moves beyond said given range in a given direction, thereby adding an increment of force to said primary member in opposition to said drag, and control means operatively connected to said terminals for moving them in a direction to cause said primary member to operate within an auxiliary range beyond said given range in said given direction.

4. In a dynamometer comprising a primary member movable in accordance with the drag exerted thereon by a rotated element and operatively connected to a drag-controlling device adapted when said primary member moves in one direction from a first nominal position to increase said drag and when said primary member moves in a second direction from said first nominal position to decrease said drag, the normal operating positions of said primary member therefore being within a given range; the improvement which comprises means sensitive to the movement of said primary member beyond said given range in a given direction for adding an increment of force thereto in opposition to said drag, and control means operatively connected to said drag-controlling device and effective to modify the latter so that said primary member will assume a second nominal position spaced from said first nominal position beyond said given range in said given direction.

5. In a dynamometer comprising a primary member movable in accordance with the drag exerted thereon by a rotated element and operatively connected to a drag-controlling device adapted when said primary member moves in one direction from a first nominal position to increase said drag and when said primary member moves in a second direction from said first nominal position to decrease said drag, the normal operating positions of said primary member therefore being within a given range; the improvement which comprises an auxiliary member engageable by said primary member when the latter moves beyond said given range in a given direction, thereby adding an increment of force to said primary member in opposition to said drag, and control means operatively connected to said drag-controlling device and effective to modify said device so that said primary member will assume a new range of operating positions spaced beyond said given range of operating positions in said given direction, thereby engaging said auxiliary member.

6. In a dynamometer comprising a primary member movable in accordance with the drag exerted thereon by a rotated element and operatively connected to a drag-controlling device adapted when said primary member moves in one direction from a first nominal position to increase said drag and when said primary member moves in a second direction from said first nominal position to decrease said drag, the normal operating positions of said primary member therefore being within a given range; the improvement which comprises an auxiliary member, means for supporting said auxiliary member independently of said primary member and operatively disconnected from said primary member when said primary member is positioned within said given range, means operatively connecting said primary and auxiliary members and disconnecting said auxiliary member from said supporting means when said primary member moves beyond said given range in a given direction, thereby adding an increment of force to said primary member in opposition to said drag, and control means operatively connected to said drag-controlling device and effective to modify said device so that said primary member will assume a new range of operating positions spaced beyond said given range of operating positions in said given direction, thereby engaging said auxiliary member.

7. In a dynamometer comprising a rotated element, a yoke mounted for pivotal movement about the axis of said element and carrying coils which, when energized, produce an electromagnetic drag between said yoke and said element, means for applying a first torque to said yoke in opposition to said drag, and electrical connections to said coils including switch means sensitive to the position of said yoke and effective, upon departure of said yoke from a first nominal position in one direction or the other respectively to increase or decrease the energization of said coils, thereby increasing or decreasing the electromagnetic drag between yoke and element and causing said yoke normally to be positioned within a given range; the improvement which comprises an auxiliary torque means normally supported independently of said yoke and disconnected therefrom, means operatively connecting said yoke and auxiliary torque means when said yoke moves beyond said given range in a given direction, thereby adding an increment of torque to said yoke in opposition to said drag, and control means operatively connected to said switch means and effective to establish a second nominal position of said yoke spaced from said first nominal position in said given direction and by such a distance as to cause said yoke to become operatively connected to said auxiliary torque means.

8. In the dynamometer of claim 1, in which a motor is adapted to be operatively connected to said rotated element for rotating the latter, means for altering the energization of said motor between two conditions, and an interlock between said energizing means and said control means, said interlock being effective, when said energizing means changes motor energization from one condition to another, to actuate said control means to cause said primary member to operate within said auxiliary range.

9. In the dynamometer of claim 2, in which a motor is adapted to be operatively connected to said rotated element for rotating the latter, means for altering the energization of said motor between two conditions, and an interlock between said energizing means and said control means, said interlock being effective, when said energizing means changes motor enerzgation from one condition to another, to actuate said control means to cause said primary member to operate within said auxiliary range.

10. In the dynamometer of claim 3, in which a motor is adapted to be operatively connected to said rotated element for rotating the latter, means for changing the energization of said motor between two conditions, and an interlock between said energizing means and said control means, said interlock being effective, when said energizing means changes motor energization from one condition to another, to actuate said control means to cause said primary member to operate within said auxiliary range.

11. In the dynamometer of claim 4, in which a motor is adapted to be operatively connected to said rotated element for rotating the latter, means for changing the energization of said motor between two conditions, and an interlock between said energizing means and said control means, said interlock being effective, when said energizing means changes motor energization from one condition to another, to actuate said control means to cause said primary member to assume said second nominal position.

12. In the dynamometer of claim 5, in which a motor is adapted to be operatively connected to said rotated element for rotating the latter, means for changing the energization of said motor between two conditions, and an interlock between said energizing means and said control means, said interlock being effective, when said energizing means changes motor energization from one condition to another, to actuate said control means to cause said primary member to operate within said new range of operating positions.

13. In the dynamometer of claim 6, in which a motor is adapted to be operatively connected to said rotated element for rotating the latter, means for changing the energization of said motor between two conditions, and an interlock between said energizing means and said control means, said interlock being effective, when said energizing means changes motor energization from one condition to another, to actuate said control means to cause said primary member to operate within said new range of operating positions.

14. In the dynamometer of claim 7, in which a motor is adapted to be operatively connected to said rotated element for rotating the latter, means for changing the energization of said motor between two conditions, and an interlock between said energizing means and said control means, said interlock being effective, when said energizing means changes motor energization from one condition to another, to actuate said control means to cause said primary member to assume said second nominal position.

15. In a dynamometer comprising a base, an element rotatably mounted thereon and adapted to be driven in rotation in a given direction, a yoke articulately mounted on said base in proximity to said element, coils on said yoke which, when energized, produce an electromagnetic drag between said yoke and element, whereby said yoke is caused to move in a direction corresponding to the rotation of said element, primary biasing means active on said yoke and effective to exert a force thereon in opposition to the drag-produced movement of said yoke, a movable contact operatively connected to said yoke so as to be positioned in accordance with the position of said yoke, a pair of terminals between which said contact is movable, and electric circuitry interconnecting said coils, movable contact and terminals whereby, when said yoke moves in the direction in which it is dragged, engagement of said contact with the corresponding terminal will cause a reduction in the energization of said coils and a consequent decrease in said drag, and when said yoke moves in the opposite direction engagement of said contact with the other of said terminals will cause an increase in the energization of said coils and a consequent increase in said drag, the normal operating positions of said yoke being within a given range; the improvement which comprises an auxiliary biasing means mounted on said base independently of said yoke and normally operatively disconnected therefrom, means for adjusting the position of said terminals relative to said yoke in a given sense such that said yoke is permitted to move in its dragged direction beyond said given range, and means on said yoke operatively engaging said auxiliary biasing means when said yoke moves beyond said given range, said auxiliary biasing means, when operative on said yoke, exerting thereon an additional increment of force in opposition to said drag.

16. In a dynamometer comprising a base, an element rotatably mounted thereon and adapted to be driven in rotation in a given direction, a yoke mounted on said base in proximity to said element and adapted to pivot about the axis of rotation of said element, coils on said yoke which, when energized, produce an electromagnetic drag between said yoke and element, whereby said yoke is caused to pivot in the direction of rotation of said element, primary biasing means active on said yoke and effective to exert a torque thereon in opposition to the drag-produced movement of said yoke, a movable contact operatively connected to said yoke so as to be positioned in accordance with the position of said yoke, a pair of terminals between which said contact is movable, and electric circuitry interconnecting said coils, movable contact and terminals whereby, when said yoke moves in the direction in which it is dragged, engagement of said contact with the corresponding terminal will cause a reduction in the energization of said coils and a consequent decrease in said drag, and when said yoke moves in the opposite direction engagement of said contact with the other of said terminals will cause an increase in the energization of said coils and a consequent increase in said drag, the normal operating positions of said yoke being within a given range; the improvement which comprises a weighted arm pivotally mounted on said base independently of said yoke and supported in a position disconnected from said yoke, means for adjusting the position of said terminals relative to said yoke in a given sense such that said yoke is permitted to move in its dragged direction beyond said given range, and means on said yoke engageable with said weighted arm and effective to lift said arm from the support therefor when said yoke moves in its dragged direction beyond said given range, said weighted arm, when thus lifted, adding an increment of torque to said yoke in opposition to said drag.

17. The dynamometer of claim 16, in which two supports are provided for said weighted arm, one on each side of the pivotal axis thereof, said arm being freely pivotal so as to rest upon either of the supports depending upon the direction in which said element is rotated, and means on said yoke effective to engage said arm and lift it from either of said supports depending upon the direction in which said yoke is dragged.

18. In the dynamometer of claim 17, in which a motor is adapted to be operatively connected to said rotated element for rotating the latter, means for varying the energization of said motor between two values, and an interlock between said energizing means and said means for adjusting the position of said terminals, said interlock being effective, when said energizing means increases motor energization, to actuate said terminal positioning means in said given sense.

19. In the dynamometer of claim 15, in which a motor is adapted to be operatively connected to said rotated element for rotating the latter, means for varying the energization of said motor between two values, and an interlock between said energizing means and said means for adjusting the position of said terminals, said interlock being effective, when said energizing means increases motor energization, to actuate said terminal positioning means in said given sense.

20. In the dynamometer of claim 16, in which a motor is adapted to be operatively connected to said rotated element for rotating the latter, means for varying the energization of said motor between two values, and an interlock between said energizing means and said means for adjusting the position of said terminals, said interlock being effective, when said energizing means increases motor energization, to actuate said terminal positioning means in said given sense.

References Cited in the file of this patent

UNITED STATES PATENTS

| | | |
|---|---|---|
| 854,996 | Garland | May 28, 1907 |
| 2,638,781 | McDuffie et al. | May 19, 1953 |
| 2,677,962 | Seelhoff | May 11, 1954 |